3,008,942
POLYMERIZATION SYSTEM FOR VINYL AROMATIC MONOMERS

Henry Z. Friedlander, Scarsdale, N.Y., assignor to American Cyanamid Company, New York, N.Y., a corporation of Maine
No Drawing. Filed Jan. 16, 1958, Ser. No. 709,173
7 Claims. (Cl. 260—93.5)

This invention relates to the polymerization of vinyl aromatic compounds. More particularly, this invention relates to a novel method of polymerizing vinyl aromatic monomers in a heterogeneous system wherein polymerization is effected in the presence of insoluble metal oxide catalysts. It is well known that vinyl aromatic polymers find many uses as molded articles which are formed by conventional methods such as compression or injection molding yielding articles which are transparent and possess good flexural and tensile strength as well as good electrical properties. Polymers of this type, i.e. polymers prepared from vinyl aromatic compounds having the formula:

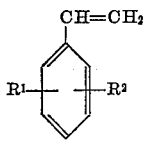

wherein $R^1$ and $R^2$ are substituents selected from the group consisting of hydrogen and methyl radicals, have previously been prepared by many methods. The product from these prior methods often suffers from impurities within the polymer. These prior methods moreover require relatively high temperatures to effect polymerization and such increased temperatures in turn adversely effect properties of the polymer.

I have discovered that polymers of this type may be prepared by a novel method which employs metal oxide catalysts. The polymerization system is heterogeneous and progresses well at relatively low temperatures to provide a product of excellent purity and physical properties.

It is an object of my invention to provide novel and useful heterogeneous catalyst systems for the preparation of high molecular weight polymers of vinyl aromatic compounds. Further objects of the invention will be apparent as the description of the invention proceeds.

Briefly, the invention comprises the polymerization of vinyl aromatic compounds to high molecular weight hard polymers by contacting the monomeric compound essentially with a metal oxide catalyst selected from the group consisting of oxides of aluminum, platinum, molybdenum, cobalt, magnesium and mixtures thereof including mixtures with silica. Present with these oxides may be small amounts of modifying elements such as the halogens. The inventive process is effected at temperatures between about −50° C. and about 80° C. Preferably temperatures close to room temperature are employed. Because of the practical advantage afforded, i.e. it is preferred that temperatures in the order of about 0° C. to about 50° C. be employed. Polymerization of the vinyl aromatic compounds is effected by direct contact with the metal oxides; however, the use of suitable diluents is not precluded. Preferably the diluent should be relatively inert. When a diluent is employed aromatic hydrocarbons such as benzene, toluene, xylene may be employed. The catalyst containing accumulate solid polymeric reaction products can be treated from time to time as is conventionally done in analogous reactions, wherein the catalyst has a tendency to be spent or poisoned through use, to effect removal of conversion products therefrom, and if necessary, to effect reactivation or regeneration of the catalyst for further use.

The essence of the process of the invention resides in the employment of solid metal oxide catalysts of the aforementioned group, namely, alumina, platinum, molybdena, cobalt, magnesium and mixtures thereof including mixtures with silica. These catalysts are employed in amounts of from about .5% to about 20% based on the weight of the monomer, preferably in amounts of from about 2% to 10%. Catalysts of this type are available commercially or may be prepared by known methods and for convenience in handling are preferably in granular or pellet form. No novelty is claimed in the method by which these catalysts are prepared. The catalyst of the present invention above described may be employed in any of a variety of suitable forms, for example, as pellets of generally cylindrical, spherical, or other shapes or even in the form of coarse lumps. These pellets may range in size from about 2 to about 6 mesh per inch. Powdered catalysts appear to increase the rate of polymerization reaction although in some instances the small catalyst particles appear to become rapidly coated with polymer and it is accordingly unnecessary to more frequently effect regeneration of the catalyst. It is preferred in the use of these catalysts that they be activated prior to the time they are employed to effect polymerization. The conditioning of these catalysts may be effected by treatment with reducing gas such as hydrogen, carbon monoxide, sulfur dioxide or with a gas such as ethylene, or by heat alone as in a muffle-furnace for example, at elevated temperatures of the order of about 300° C. to 500° C. As noted above, it will also be advantageous to recondition partially spent catalysts which may become inactivated during polymerization. Inasmuch as the presence of oxygen effects temporary poisoning of the catalyst, it is desirable to minimize or avoid the introduction of oxygen into contact with the catalyst and the reaction. Water, likewise, effects poisoning of the catalyst when present in substantial amounts. It is therefore desirable that the introduction of water or materials which produce water in contact with the catalyst of the present invention be kept to a minimum. The contact time of monomer on catalyst to effect polymerization varies considerably and may vary from a period of several hours to several days. Generally, a polymerization time of the order of about 8 to 24 hours is preferred from a practical standpoint. Following polymerization, the polymer is extracted from the reaction mixture by a suitable solvent such as methanol.

According to the invention, only those metal oxide catalysts may suitably be employed which have a pK value of between about 1 and about 4. The pK value, as the term is employed in the present invention, refers to the acid strength, and not to the acid capacity of the solid catalyst. This acid strength of the solid catalyst is defined as the ability of the catalyst to convert an absorbed neutral base to its conjugate acid. This definition is reported by Walling, J. Am. Chem. Soc., 72, 1164 (1950), and Benesi, J. Am. Chem. Soc., 78, 5490 (1956).

The following are examples of metals, the oxide of which may be utilized according to the invention together with the pK value of certain specific proportions which have been found to produce particularly good yields of vinyl aromatic polymers. It will be apparent that the proportions of these metals may be varied without departing from the inventive concept providing that the catalyst have a pK value of below 5.0.

| Type of Oxide | pK Value |
|---|---|
| 15% Mo, 3% Co on Alumina | >1.5 <2.0. |
| 9% Mo on Alumina | >1.5 <2.0. |
| 30% Mg on Silica | >1.2 <2.0. |
| 13% Al on Silica | Approx. 2.0. |
| 13% Mo, 2% F, 3% Cobalt oxide on Alumina | Approx. 2.0. |
| 0.4% Pt, 0.6% F, 0.4% Cl on Alumina | Approx. 3.3. |

In order that the invention may be more fully understood, the following examples are given for purposes of illustration. All parts are parts by weight unless otherwise expressly stated.

*Example 1*

In a suitable reaction vessel, 9 parts of styrene is added to 2.5 parts of 13% alumina on silica cracking catalyst (previously activated with hydrogen at 500° C.). The catalyst is in powdered form and has a surface area of 500 square meters per gram and a pK value of approximately 2.0. There is immediately a violent reaction resulting in the formation of polystyrene giving a yield of about 70%.

*Example 2*

Nine parts of styrene is added to 23.8 parts of activated, pelletized 9% molybdena on alumina petroleum catalyst at room temperature. The catalyst was previously activated for 4 hours at 500° C. with hydrogen and has a pK value between 1.5 and 2.0. There is an immediate exotherm to about 50°. The mixture is allowed to stand two hours while cooling back to room temperature. 2.2 parts or more than 24% yield of polystyrene product is isolated.

*Example 3*

Nine parts of styrene is added to 8.3 parts of 15% molybdena and 3% cobalt oxide on alumina activated, pelletized (one-quarter inch pellets) petroleum catalyst at room temperature. The catalyst is activated for 3 hours at 500° C. with hydrogen and has a pK value of 1.5–2.0. There is a mild exotherm. After standing at room temperature for three days, 2.0 parts or about 22% of polystyrene is isolated from this tube by precipitation into methanol.

*Example 4*

To 2.6 parts of a catalyst comprising 0.4% platinum, 0.6% fluorine and 0.4% chlorine on alumina as carrier having a pK value of below 3.3 in a suitable reaction vessel is added 8.0 parts of cyclohexane as diluent. The reaction vessel is refrigerated at −15° C. for several hours. 14 parts of styrene is added to the reaction vessel which is then maintained at 25° C. for 24 hours. 29% of polystyrene is isolated from the solution by precipitation into methanol.

*Example 5*

To 50 parts of pure dry monomethylstyrene (the monomer is passed through a column and distilled under vacuum just prior to use) in a suitable reaction vessel is introduced two parts of catalyst comprising 15% molybdena and 3% cobalt oxide on alumina having a pK of between 1.5 and 2.0. The mixture is heated to a temperature of 80° C. for two hours. The reaction produced is filtered and the polymer in solution is precipitated by pouring into methanol. Polymethylstyrene is filtered with methanol and rinsed with methanol and distilled with calcium chloride under reduced pressure. The yield is approximately 10%.

*Example 6*

Example 5 is repeated with the exception that 6 parts of a silica-magnesia catalyst is employed with 45 parts of styrene at 25° C. The catalyst has a pK value of between 1.2 and 2.0. After 24 hours at room temperature, the polymer is isolated as described in Example 5. The yield is 18%.

Polymers prepared according to the procedures of the present invention are normally solid and have specific viscosities corresponding to estimated molecular weights of up to 500,000 and even higher. It will be apparent that only a limited number of embodiments of the present invention has been described, but it is possible to provide other variations without departing from the inventive concept hereindisclosed. It is therefore desired that only such limitations be imposed on the invention as required by the appended claims.

I claim:
1. A method of making a solid homopolymer of vinyl aromatic monomeric compounds having the formula

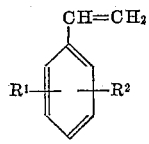

wherein $R^1$ and $R^2$ are substituents selected from the group consisting of hydrogen and methyl radicals, as sole monomers, which comprises admixing, as a slurry said monomeric compound with .5 to 20%, based on the weight of the monomer, of a metal oxide catalyst, polymerizing at a temperature between about −50° C. and about 80° C. and recovering the polymerization product, said catalyst having a pK value in the range of about 1.0 to 5.0 and being selected from the group consisting of oxides of aluminum, platinum, molybdenum, cobalt and magnesium on a support selected from the group consisting of silica and alumina, as sole components of the catalyst system, said pK value being defined as the ability of the catalyst surface to convert an adsorbed neutral base to its conjugate acid.

2. A method of making a solid homopolymer of vinyl aromatic compounds having the formula

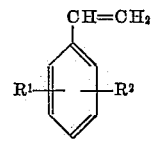

wherein $R^1$ and $R^2$ are substituents selected from the group consisting of hydrogen and methyl radicals, as sole monomers, which comprises admixing, as a slurry, said monomeric compound with .5 to 20%, based on the weight of the monomer, of a metal oxide catalyst, polymerizing at temperatures between about −50° C. and about 80° C. and recovering the polymerization product, said catalyst being selected from the group consisting of oxides of aluminum, platinum, molybdenum, cobalt and magnesium on a support selected from the group consisting of silica and alumina, as sole components of the catalyst system, activation of said catalyst, before contacting with said polymer, being effected by treatment with a suitable gas at temperatures of at least 300° C. for a period of time sufficient to effect substantial activation of said catalyst, said pK value being defined as the ability of the catalyst surface to convert an adsorbed neutral base to its conjugate acid.

3. The method of claim 1 wherein the vinyl aromatic compound is dissolved in an inert liquid organic diluent prior to polymerization.

4. The method of claim 1 wherein the vinyl aromatic monomer is styrene.

5. The method of claim 1 wherein the vinyl aromatic monomer is monomethylstyrene.

6. A method of making a solid homopolymer of styrene which comprises admixing, as a slurry, monomeric styrene with .5 to 20%, based on the weight of the monomer, of an activated molybdena-alumina catalyst, polymerizing at temperatures between about −50° C. and about 80° C. and recovering the polymerization product, said catalyst having a pK value in the range of about 1.0 to 5.0, activation of said catalyst, before contacting with said monomeric styrene, being effected with hydrogen at temperatures of at least 300° C. for at least 3 hours, said pK value being defined as the ability of the catalyst surface to convert and adsorbed neutral base to its conjugate acid.

7. The process of claim 6 wherein monomethylstyrene is employed in place of styrene.

References Cited in the file of this patent

UNITED STATES PATENTS

| | | |
|---|---|---|
| 2,692,257 | Zletz | Oct. 19, 1954 |
| 2,762,790 | Greene | Sept. 11, 1956 |
| 2,780,617 | Zletz | Feb. 5, 1957 |
| 2,882,263 | Natta et al. | Apr. 14, 1959 |

OTHER REFERENCES

Boundy-Boyer: Styrene etc., pp. 336–337, 1952, Reinhold Publ. Corp., N.Y.

Walling: J. Amer. Chem. Soc., vol. 72, p. 1164 (1950).